United States Patent Office 3,414,812
Patented Dec. 3, 1968

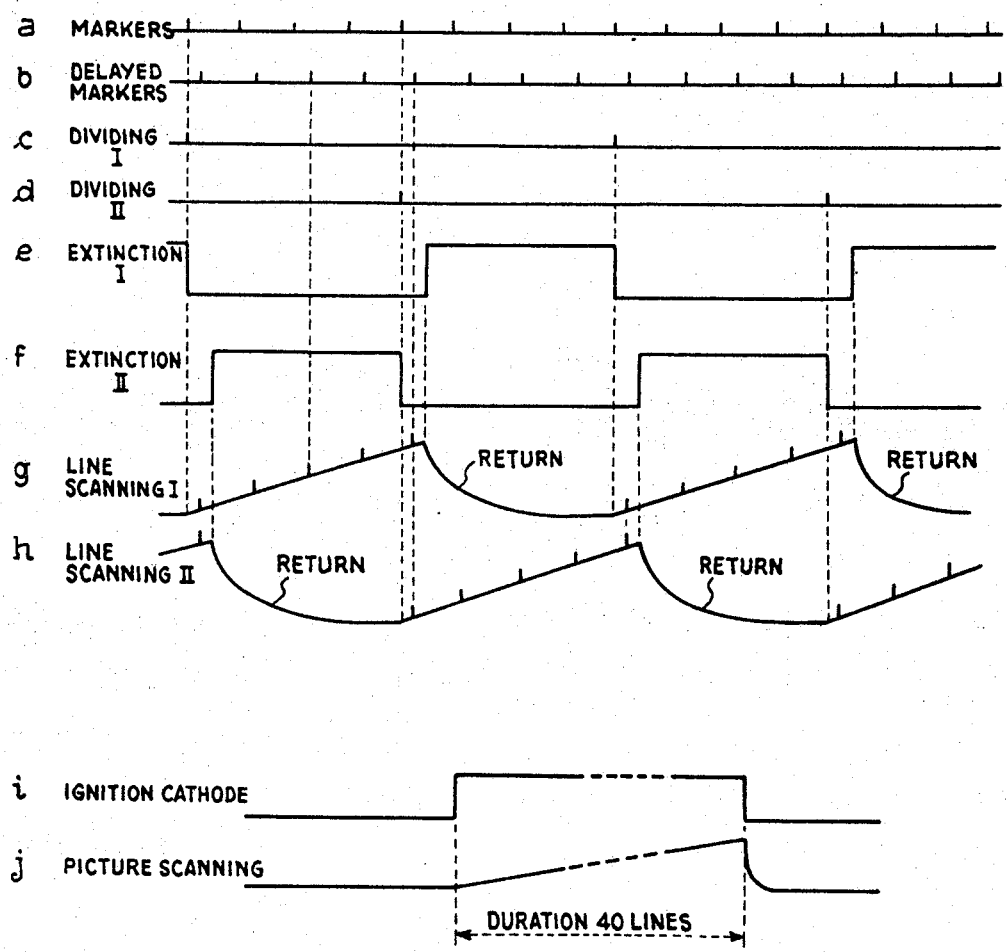
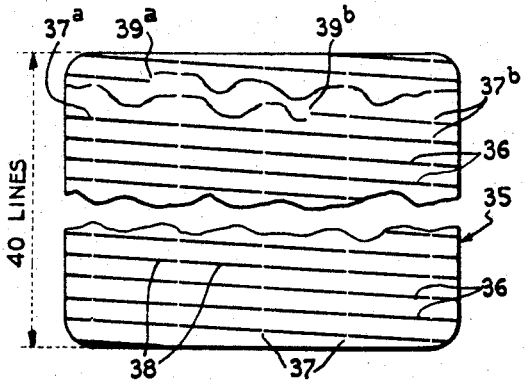
FIG.2
FIG.3

3,414,812
DEVICE FOR MEASURING TIME INTERVALS BETWEEN INSTANTS MARKING THE COURSE OF THE PHENOMENON
Robert L. Niel, Bourg-la-Reine, France, assignor to Commissariat à l'Energie Atomique, Paris, France, a French body corporate
Filed July 26, 1966, Ser. No. 567,957
Claims priority, application France, July 29, 1965, 26,420
4 Claims. (Cl. 324—68)

ABSTRACT OF THE DISCLOSURE

Device comprising means for displaying at a constant speed two groups of interlaced parallel lines on a record, such as the screen of a cathode tube, a generator for displaying markers providing regular intervals on these lines, and means for displaying the beginning and the ending of the phenomenon on the record by measuring markers, whereby the duration of the phenomenon is equal to the number of intervals recorded on the screen between the measuring markers.

---

The present invention relates to a device for measuring time intervals between instants marking the course of a phenomenon.

It is known to measure the time intervals between various phenomena, converted into electric signals, by employing a recording device and in particular an oscillograph. In a first oscilographic method, an electronic switch permits comparing the phenomena studied with a sine wave or a square voltage wave of known frequency. It is sufficient to count the number of cycles corresponding to the time interval to be measured, ascertained by particularities in the curve representing the signal, to know this interval. In another method, the curve to be studied is marked at equal intervals by superimposing thereon voltage pulses or by modulating the luminous intensitivity of the oscillograph trace by pulses which are sent to the electrode generating the beam of electrons and which, in accordance with their polarity, give on the line of the curve dark or very bright spots.

The curves obtained by these methods are usually recorded in the form of photographs which conserve the appearance of the signal and can be used with the optical micrometer.

The amount of information thus recorded depends on the thickness of the trace which limits the precision and is given by the tube; it also depends on the length of the trace which must be rendered maximum. For this purpose, various scannings are usually employed. Sinusoidal scanning and spiral or "helical" scanning are difficult to employ since the speed of describing the curve varies and the precision is therefore not constant along the line. Zig-zag or "triangular" scanning is precise and easy to use but the points of direction change of the trace constitute lost time which is the greater as the forward and rearward lines are greater in number, that is, closer together.

The invention relates to a method for meausring time intervals which is applicable in particular to an oscillograph employing scanning which does not have the aforementioned drawbacks.

This measuring method for measuring time intervals between instants marking the course of phenomena converted into an electric voltage, comprises applying said voltage—in superimposition with a constant-speed scanning voltage and voltage pulses generating markers evenly spaced in time—to a recording device having two independent and identical rectangular coordinates, and applying, on one hand, simultaneously, according to the homologous coordinates of two recording devices having two independent and identical rectangular coordinates, the scanning voltage, the marking pulses and the voltage representing said phenomena, and, on the other hand, successively, according to the other homologous coordinates of the two recording devices, a scanning voltage generating parallel and equally-spaced lines each of which comprises a constant and given number of marker strokes perpendicular to said lines and preferably not coinciding with the ends of said lines, the last marker of any line traced by one of the devices coinciding in time with the first marker of the following line traced by the second device.

The device which employs said method and is in particular applicable to a cathode oscillograph, comprises a cathode tube having two beams, an electronic clock generating pulses equally spaced in time, a divider having two outputs selecting from said pulses a certain number thereof which are evenly spaced in time so that the pulses received at one of the outputs coincide in time with the mid-points of the intervals between the pulses received at the other output, two scanning assemblies each of which is connected to one of the outputs of the divider and each connected to one pair of homologous deflector plates corresponding to one of the two beams of the cathode tube, and an apparatus generating from the pulses issuing from the electronic clock markers which are produced at a given frequency, and connected in the same way as the input receiving the signals to be analyzed, to the two other pairs of homologous deflector plates of the oscillograph.

With reference to the accompanying drawing, there will now be described by way of example one mode of carrying out the method and an embodiment of the measuring device according to the invention. The constructional arrangements described hereinafter in respect of said mode and embodiment should be considered as being part of the invention, it being understood that any equivalent arrangements could also be employed without departing from the scope of the invention.

Only the elements necessary for an understanding of the invention have been shown in the figures.

FIG. 2 is a diagram representing the outputs of several blocks of FIG. 1 in their exact time relationship;

FIG. 3 represents the displaying screen of the device of FIG. 1.

Figure 1:
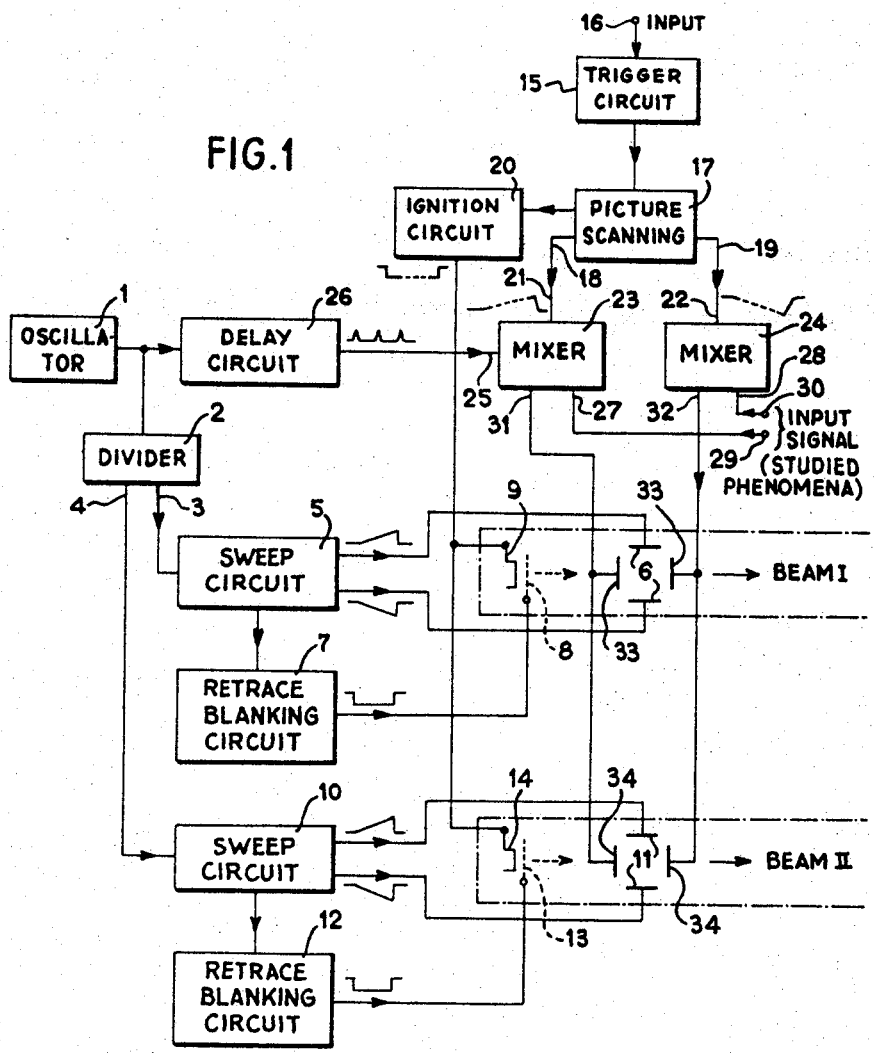
FIG. 1 shows the main circuit diagram of a device according to the invention applicable to a cathodic oscillograph.

A crystal controlled oscillator 1 (FIG. 1 and line *a* of FIG. 2) is connected to the divider 2 having two outputs 3 and 4 respectively, each of which selects one out of eight of the pulses issuing from the oscillator 1 at instants separated by four intervals between these pulses. The output 3 (FIG. 2, line *c*) connected to a sweep circuit 5 connected to the deflector plates 6 relating to the first beam of the cathode tube. The sweep circuit 5 controls a retrace blanking circuit 7 (FIG. 2, line *e*) applied to the grid 8 controlling the first cathode beam issuing from the cathode 9. The output 4 (FIG. 2, line *d*) is in the same way connected to a sweep circuit unit 10 connected to the deflector plates 11 pertaining to the second beam of the cathode tube and to a retrace blanking circuit 12 applied to the grid 13 controlling this beam issuing from the cathode 14. A trigger circuit 15 provided with an input 16 is connected to a device 17 producing a scanning or "picture scanning" (FIG. 2, line *j*) and having two symmetrical outputs 18 and 19. This device is connected to an ignition device 20 (FIG. 2, line *i*) simultaneously connected to the two cathodes 9 and 14 pertaining to each of the beams. The two outputs 18 and 19 lead to the inputs 21 and 22 respectively of two mixers 23 and 24. Leading to the second input 25 of the mixer 23 is the delay circuit 26 which receives the series of pulses generated by the crystal controlled oscillator 1 and whose output is represented by line *b* (FIG. 2). Connected to the inputs 27 and 28 of the mixers 23 and 24 respectively are the inputs 29 and 30 which receive the signals representing the studied phenomena. The respective outputs 31 and 32 of the mixers 23 and 24 are connected to the pairs of plates 33 and 34 pertaining to the first beam and the second beam and connected in parallel.

The device operates in the following manner:

The picture scanning and the lighting up of the cathode beams are triggered by a pulse sent to 16 for a duration corresponding to forty lines: a negative pulse at the input of a bistable multivibrator initiates the saw-tooth signal having a duration of 200–400 μsec. of the picture scanning and applies a voltage signal of the square type to the two cathodes 9 and 14 during the same period. The pulses issuing from the delay circuit 26 are superimposed on said scanning as well as the input signals applied symmetrically at 29 and 30.

A pulse received at the output 3 of the divider 2 applied to a monostable multivibrator generates the saw-tooth signal having a duration of 5–10 μsec. of the sweep pertaining to the first oscillograph beam. The line traced can thus comprise four marker pulses.

The sweep pertaining to the second beam is triggered after a period of time corresponding to four times the interval between two pulses issuing from the oscillator 1.

FIG. 3 shows the displaying screen 35 of an oscillograph wherein the resultant scanning is such that the oscillograph line or trace consists of parallel oblique lines 36 each of which comprises five markers 37, therefore four useful intervals 38, the last marker 37*b* of one of the lines corresponding in time to the first marker of the following line. In the presence of an input signal, the measurement of the time interval between two particular points 39*a*, 39*b* will be obtained by counting the number of markers between these two points and effecting two interpolations relating to the markers which are the closest to the two ends of the considered interval.

The error in the measurement is due to the precision and the stability of the crystal controlled oscillator to the linearity defect of the sweep and to the thickness of the trace of the selected tube. If a tube is employed whose trace thickness is 0.2 mm. and is capable of recording forty lines of 8 cm. length distributed at four effective intervals, the total error is 10 μsec., namely $0.6 \times 10^{-4}$ of the total recording capacity if the precision of the crystal controlled oscillator has a value $10^{-5}$ and if the sweep is linear to within 1%.

It has been possible to construct on this principle apparatuses whose recording range ranges from 10 μsec. (which gives a better precision than the nanosecond), to 1 msec. which corresponds to a precision better than 100 nsec. This range is not intended to be a limitation of the scope of the invention.

The marker pulses instead of being directed to the deflector plates can be sent to the cathodes 9 and 14 or to the grids 8 and 13 so as to modulate the luminosity of the trace.

It is possible to contemplate employing this manner of scanning not in an oscillograph but a mechanical recorder.

Although specific embodiments of the invention have been described, many modifications and changes may be made therein without departing from the scope of the invention as defined in the appended claims.

Having now described my invention what I claim as new and desire to secure by Letters Patent is:

1. An electronic device for measuring time intervals between instants marking the course of phenomena converted into an electric voltage, said device comprising a cathode ray tube having two beams, an electronic clock generating pulses equally spaced in time, a divider connected to the clock and having two outputs selecting from said pulses a certain number thereof which are evenly spaced in time so that the pulses received at one of the outputs of the divider coincide in time with the mid-points of the intervals between the pulses received at the other output of the divider, one pair of homolocous deflector plates corresponding to one of the two beams of the cathode ray tube, another pair or homolocous deflector plates corresponding to the other of said beams, two scanning assemblies respectively connected to said outputs of the divider and respectively connected to said two pairs of deflector plates, and an apparatus connected to said clock and generating from the pulses issuing from the clock markers which are produced at a given frequency.

2. An electronic device for measuring time intervals between instants marking the course of phenomena converted into an electric voltage, said device comprising a cathode ray tube having two beams, an electronic clock generating pulses equally spaced in time, a divider connected to the clock and having two outputs selecting from said pulses a certain number thereof which are evenly spaced in time so that the pulses received at one of the outputs of the divider coincide in time with the mid-points of the intervals between the pulses received at the other output of the divider, one pair of homologous deflector plates corresponding to one of the two beams of the cathode ray tube, another pair of homologous deflector plates corresponding to the other of said beams, two scanning assemblies respectively connected to said outputs of the divider and respectively connected to said two pairs of deflector plates, and an apparatus connected to said clock and generating from the pulses issuing from the clock markers which are produced at a given frequency, said device having an input for receiving the signals to be analyzed and said apparatus and said signal-receiving input being simultaneously connected to the two other pairs of homologous deflector plates of the cathode ray tube.

3. A device as claimed in claim 2, wherein said apparatus is connected simultaneously to the production or control electrodes of said two beams of the cathode ray tube.

4. A device for measuring time intervals between instants marking the course of a phenomenon, the duration of which is to be measured, said device comprising first displaying means for displaying, at a constant speed, on a record a first group of parallel, equidistant lines, second displaying means for displaying at said constant speed and on said record a second group of equidistant lines, parallel and interlaced with the lines of said first group, marking means for marking on said lines equally spaced markers, means for generating the first marker of each in time coincidence with the last marker of the preceding line, and third displaying means for displaying said phenomenon on said group of lines.

References Cited

UNITED STATES PATENTS

| 3,292,083 | 12/1966 | Presbrey | 324—68 |
| 2,680,210 | 6/1954 | Miller et al. | 324—121 |
| 2,651,752 | 9/1953 | Devot | 324—68 |
| 2,448,363 | 8/1948 | Firestone et al. | 324—68 |
| 2,434,264 | 1/1948 | Edson | 324—68 |
| 2,428,424 | 10/1947 | Landon | 324—68 |
| 2,412,350 | 12/1946 | Morgan | 324—121 |
| 2,394,196 | 2/1946 | Morgan | 324—121 |
| 2,275,460 | 3/1942 | Page | 324—121 |
| 2,143,933 | 1/1939 | Barthelemy | 315—23 |

RUDOLPH V. ROLINEC, *Primary Examiner.*

P. F. WILLE, *Assistant Examiner.*